United States Patent Office 3,403,595
Patented Oct. 1, 1968

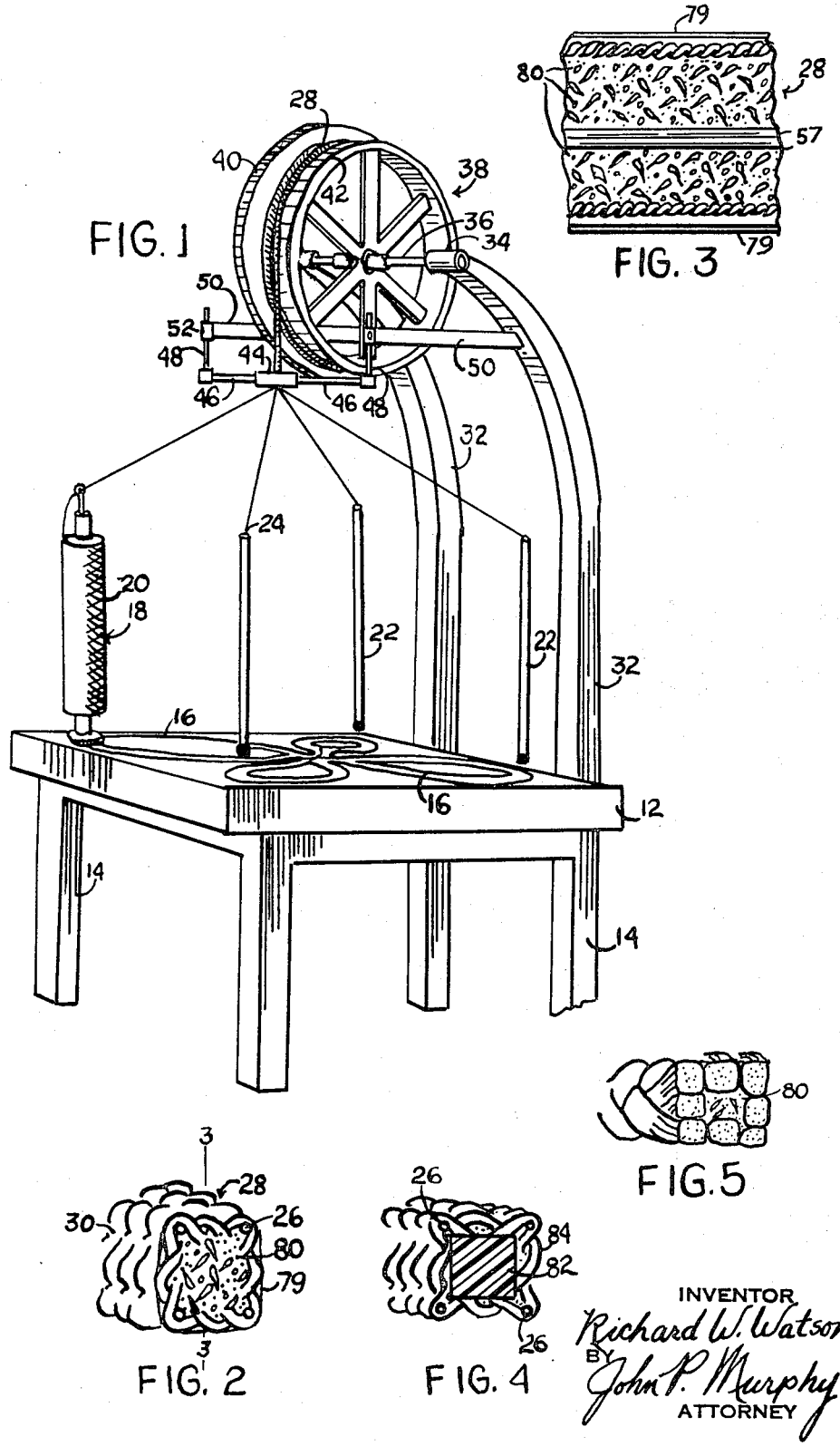

3,403,595
GRAPHITE BRAIDED PACKING
Richard W. Watson, Palmyra, N.Y., assignor to Garlock Inc., Palmyra, N.Y., a corporation of New York
Filed Feb. 24, 1966, Ser. No. 529,888
6 Claims. (Cl. 87—1)

ABSTRACT OF THE DISCLOSURE

Braided packing material comprising an elongate braid of graphite strands of fibrous material, said strands and interstices therebetween, being thoroughly impregnated with impregnating material comprising a fluorocarbon resin.

---

This invention relates to new sealing materials. More particularly, it relates to the provision of new structures which are temperature and corrosion-resistant, which are capable of withstanding high temperatures, and highly corrosive environments, as are found in the chemical industry, and in similar operations. More specifically, it relates to braided packings, molded packings, gaskets, and similar sealing devices, made of flexible graphite filaments impregnated with a fluorocarbon resin.

In industrial processes and in many machines, sealing materials are needed which are corrosion-resistant, and heat-resistant, and which, at the same time, will provide for a long period of service. This is particularly true in the case of stuffing boxes in machinery as, for example, in an arrangement for packing a rotary shaft or reciprocating rod at a point where the shaft or rod extends through a packed opening into a part of a machine containing some fluid, or gas, to be held therein against escape.

Conventional packings, as used commercially, generally consist of certain fibers such as flax, jute, cotton, asbestos and others; spun; twisted, or wrapped into rovings and yarns that are braided, twisted or woven into packings of various sizes for piston rods, plungers, shafts, valve stems or other moving, mechanical parts. Such packings may be impregnated with liquid lubricants, greases and lubricating compounds to reduce friction. Said packings, furthermore, are frequently armored or combined with various metals such as lead, copper, aluminum, etc., to further reduce friction and give a full metallic or semi-metallic wearing face on the moving parts. The method of combining the metal with other ingredients usually involves a process of wrapping, twisting, or interbraiding the metal in the form of foil, or wire, to produce the metallic or semi-metallic wearing face.

The objection to such packings is that the greases or other lubricating compounds, under certain conditions of temperature and pressure, will soften or melt, and run out, or be squeezed out of the packing under compression, and under continued wear. Thus, the packing does not retain its original characteristics and, after a certain interval, becomes unsuited for its purpose.

Packings have also been made by impregnating glass fibers, "Teflon" fibers ("Teflon" is a trademark of the Du Pont Company), and asbestos fibers, and also other synthetic, and natural fibers, with fluorocarbon resins. However, all of these packings have disadvantages from the standpoint of resisting temperature, corrosion, or having a very short service life.

It is an object of this invention to produce a material suitable for packing purposes which has high temperature and chemical resistance, and is resilient.

Another object is to produce a material suitable for packings that has greater dimensional stability through a greater range of temperatures.

Another object is to produce a fluorocarbon impregnated packing material which is compressible, but does not permanently deform, laterally, under high stuffing box pressures.

Another object is to provide a method for incorporating fluorocarbon resins permanently into a packing material to obtain increased dimensional stability and still provide sealing action.

Another object is to produce a packing material impregnated with fluorocarbon resin which has three-dimensional strength, and has the required porosity to permanently retain the fluorocarbon resin particles in and on the packing.

Various other objects and advantages of the present invention will become apparent as this description proceeds.

These and other objects may be accomplished and the disadvantages of the prior art packing materials may be overcome by the use of a packing material comprising an elongate braid of strands of graphite, said strands and interstices therebetween being thoroughly impregnated with impregnating material comprising finely divided fluorocarbon resin.

As used herein, the term "fluorocarbon resin," means any polymer derived at least, in part, from tetrafluoroethylene. The tetrafluoroethylene content may vary. Because of its superior heat and chemical resistance, the homopolymer, polytetrafluoroethylene, is preferred. The copolymers of tetrafluoroethylene include copolymers of tetrafluoroethylene with one or more unsaturated organic compounds containing a terminal ethylenic double bond and being copolymerizable with tetrafluoroethylene, being exemplified by such monomers as ethylene, trifluorochloroethylene, difluorodichloroethylene, vinyl fluoride, hexafluoropropylene, vinylidene chloride and similar compounds.

In practicing this invention in the manufacture of packing material, a graphitized monofilament, or fiber, as described in U.S. Patent No. 3,107,152, may be employed.

Before describing apparatus suitable for carrying out the process, the latter is outlined briefly as follows:

The graphitized fibers are drawn off a suitable support, such as reels, and have a fluorocarbon resin applied thereto, preferably while separated from each other, hereinafter described in more detail. Said fibers, or strands, are then preferably twisted to form a single multiple-ply roving, after which the same is wound on bobbins and used in a braiding machine to form a braided product. The braiding operation builds up a packing of the desired cross-section, usually square, but it may be in different forms. At this point, the packing may be run through rollers to square it more accurately, which operation compresses it more or less as may be desired. The fluorocarbon resin may be preferably applied at two stages in the process, and is then dried in an oven at 130 degrees F. The fluorocarbon resins, in which the graphitized fiber yarns are dipped, are in the form of fluid dispersions which are capable of thoroughly penetrating into the fibrous material, and thoroughly impregnating the same. Such dispersions preferably contain one or more of the many suitable dispersion stabilizing agents, such as "Triton X–100," manufactured by the Rohm and Haas Co. Such dispersions, or suspensoids, are described in U.S. Patent No. 2,478,229. Suitable polymer and copolymer colloidal dispersions, or emulsions, which may be used in the practice of the present invention are also described in U.S. Patent Nos. 2,534,058, 2,559,752, 2,613,193, and 2,718,452.

In addition to the suspensoids, or colloidal dispersions of virgin fluorocarbon resin, as described above, presintered "Teflon," and "Teflon"-like materials may be employed in the practice of the present invention. Such materials, and the method of their application to the "Lattice-Braid" packing (trademark of Garlock Inc.) are described in U.S. Patent No. 3,124,032.

The accompanying drawings show, for illustrative purposes, a type of braided packing according to this invention, and one of the various mechanical devices which may be used to manufacture such packing.

In the drawing:

FIGURE 1 is a largely diagrammatic perspective view of mechanical means for making the subject braided packing.

FIGURE 2 is a fragmentary, cross-sectionalized view of braided packing according to this invention.

FIGURE 3 is an enlarged, longitudinal sectional view of the packing taken on the line 3—3 of FIG. 2.

FIGURE 4 is a view, of the same character as FIG. 2, but illustrating another form of packing according to this invention.

FIGURE 5 is a view, of the same character as FIG. 2, but illustrating yet another form of packing according to this invention.

FIG. 1 shows a known form of brading machine, but only sufficient detail to afford an understanding of this invention. The machine comprises a flat table 12, mounted on supports 14, and formed with continuous slots 16 which define a more or less undulating path, back and forth, and in various directions across the table. Slidably mounted upon the table and at various spaced points along said slots 16 are plural yarn carriers 18 (only one being shown), each including a roll 20 of graphite yarn; and these carriers are positively moved upon the table, in and under the guidance of said slots by suitable gear means (not shown) underneath the top of the table. Yarn drawn from these carriers becomes, what may be termed, the "braided yarn" of the finished braid.

Means may also be provided for feeding some strands of graphite yarn straight into the braid being formed. Such strands will extend in substantially straight lines longitudinally of the braid and may be termed "longitudinal strands"; and these longitudinal strands serve to limit the extensibility of the finished braid as well as to shape the braid into a square cross-section. The means for feeding these longitudinal strands into the braid are illustrated as similar corner masts 22 fixed upon the table near each of the latter's corners. Strands of graphite yarn, drawn from yarn rolls (not shown) beneath the table, are drawn upwardly through eyelets 24 at the upper ends of the masts; these strands become longitudinal side strands 26 in the braid 28 as shown in FIG. 2, the braided graphite yarn being indicated at 30 in said FIG. 2.

Extending rigidly from the back of the table are two uprights 32, each having at its upper end a bearing 34 which accommodates an axle or shaft 36 of a wheel 38 having an integral ring gear 40 by means of which, in association with other gears (not shown), the wheel 38 is positively rotated. The rim of the wheel 38 is in the form of a narrow drum 42 about which one or several turns of the braid may extend and be tightened or loosened by means (not shown) to prevent slippage of the braid on the drum, and hence, cause upward pull of the braid formed from the strands of yarn fed upwardly from the carriers 18 and the masts 22.

The strands of yarn, in passing upwardly from the carriers 18 and masts 22, are guided together through a braiding die 44 in a cross-member member 46 having upwardly extending slide arms 48, adjustably slidable in suitable vertical bores in the outer ends of brackets 50, which are suitably fixed to the uprights 32. Set screws 52, at the ends of the brackets 50, serve to lock the cross-member 46 at any level to which it may be adjusted.

The braiding operation proceeds in a well-understood, conventional manner. After the braid-producing operations thus far described, the braid may be immersed in a "Teflon" suspensoid to give it a coating 79 which more securely bonds the external "Teflon" particles to the surface of the braid. The impregnated braid also undergoes a further operation, not illustrated, in which it is calendered to give it a relatively smooth surface and to establish its desired cross-sectional shape. The impregnated braid is given an air cure in a heated oven until the water constituent is dispelled from the braid, leaving the braid thoroughly impregnated with "Teflon."

Thus, full advantage is taken of the filling, sealing, heat-resisting, inertness, and low-friction characteristics of "Teflon." Although the impregnation of the braid with particles of "Teflon" is so thorough as to render it impracticable to distinctly illustrate those particles, nevertheless, they have at least been indicated in FIGS. 2, 3 and 5, by numerous dots at 80 in those figures.

This invention may be utilized in, or relating to, packing which is not necessarily braided throughout its diameter. Thus, as illustrated in FIG. 4, a finished braided packing, within this invention, may have a core 82 of some plastic material, selected in accordance with the particular use in which the packing is to be employed. The braided portion 84, of course, would be thoroughly impregnated with finely divided scrap "Teflon," similarly to the impregnation indicated in FIG. 3.

The sealing materials provided hereby are insoluble in all known volatile solvents; they are stable at high temperatures; they are abrasion resistant; are relatively chemically inert; and have a low thermal expansion, allowing the sealing of either hot or cold materials alternately. They present surfaces which are not sticky but are advantageously waxy in character. The movability of the fibrous and non-fibrous components, separately and relatively to each other, makes for excellent sealing under low, medium, or high pressure applications, and their resistance makes then especially useful in these applications which involve highly chemical environments.

The thermal conductivity factor of the packing of the present invention is relatively high, and its ability to transfer heat is believed to be, in theory, a principal reason for its success in providing a long service life in operation.

Tests of the braided packings, described in the specific embodiment above, have shown the new packings of the present invention to be still in use in operating service many weeks, and in some cases, several months, after installation in a high temperature and chemically adverse environment, whereas previously available sealing devices for this purpose, failed within a period of days.

This is a surprising result in view of the fact that previous seals and packings have employed relatively chemically inert materials, such as white and blue asbestos, "Teflon," and various mechanical seal face materials well known to the art, including graphite in a non-fibrous form.

While the particular embodiment of the invention has been described as a braided packing, it will be understood that the novel materials in the present invention may also be employed in the form of gaskets, and molded packings.

It will be apparent that the present inventive concept may be utilized in various ways other than disclosed herein without, however, departing from the invention as set forth in the following claims.

It is claimed:

1. Braided packing material comprising an elongate braid of graphite strands of fibrous material, said strands and interstices therebetween being thoroughly impregnated with impregnating material comprising a fluorocarbon resin.

2. Packing material according to claim 1, said fluorocarbon resin constituting of at least 95% of said impregnating material in the packing material when the latter is ready for use.

3. The article of claim 1, in which the fluorocarbon resin is polytetrafluoroethylene.

4. A method of forming braided packing material thoroughly impregnated with finely divided fluorocarbon resin comprising preparing a suspensoid which includes a substantial volume of said finely divided fluorocarbon resin, intermixed with an emulsifying agent and water, and applying said suspensoid to graphite strands of yarn during the forming of the latter into an elongate braid.

5. The method according to claim 4, wherein the finely divided fluorocarbon resin is polytetrafluoroethylene of a fineness of between 40 and 100 (both inclusive) screen mesh to the inch.

6. Packing material comprising an elongate braid of graphite strands of fibrous material, said strands and interstices therebetween being thoroughly impregnated with impregnating material comprising a fluorocarbon resin.

References Cited

UNITED STATES PATENTS

| | | |
|---|---|---|
| 2,497,046 | 2/1950 | Kropa. |
| 2,712,509 | 7/1955 | Biefeld. |
| 2,764,506 | 9/1956 | Piccard. |
| 2,930,106 | 3/1960 | Wrotnowski et al. |
| 3,124,032 | 3/1964 | Webster et al. _____ 87—1 |
| 3,306,155 | 2/1967 | Zumeta et al. _____ 87—1 |

JOHN PETRAKES, *Primary Examiner.*